UNITED STATES PATENT OFFICE.

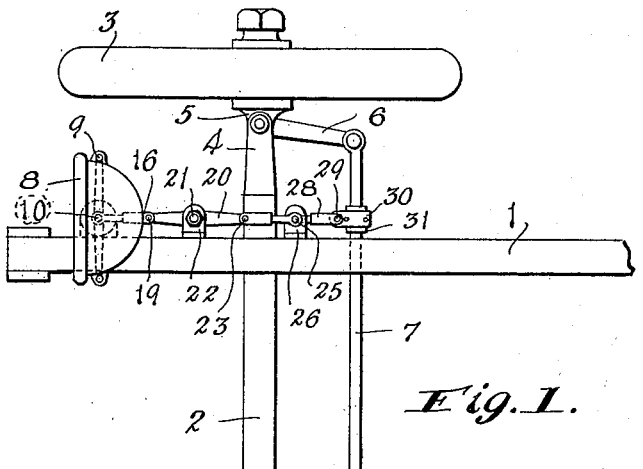
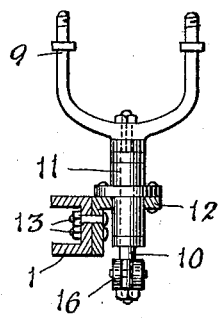
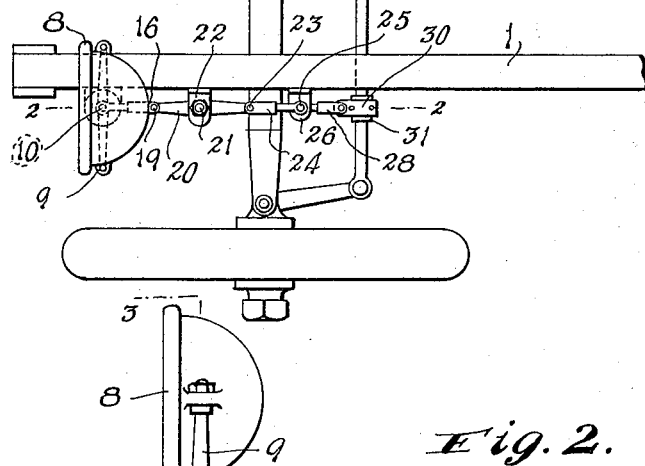
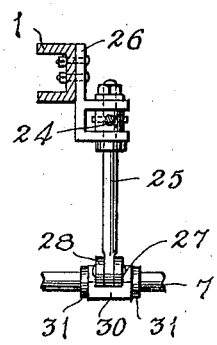
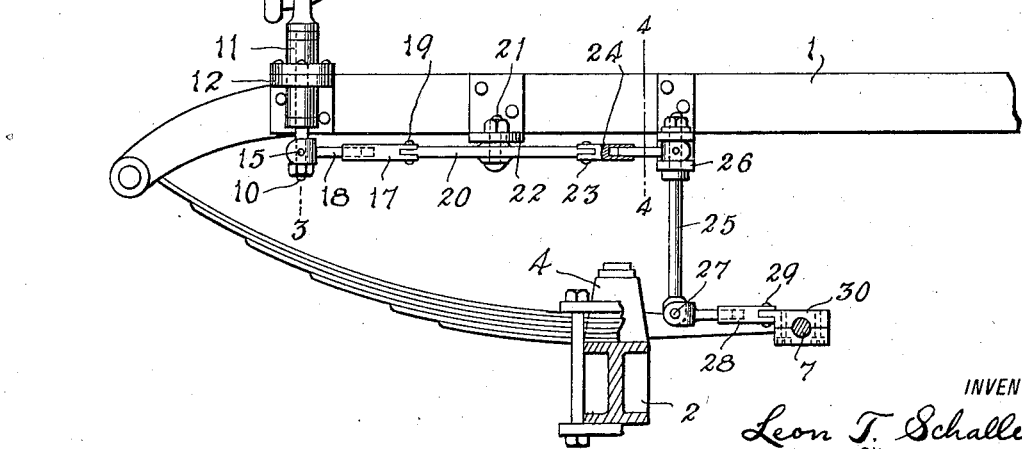

LEON T. SCHALLER, OF IRVINGTON, NEW JERSEY.

DIRIGIBLE AUTOMATIC HEADLIGHT.

1,386,957.      Specification of Letters Patent.      Patented Aug. 9, 1921.

Application filed January 12, 1920. Serial No. 350,746.

*To all whom it may concern:*

Be it known that I, LEON T. SCHALLER, a citizen of Switzerland, and a resident of Irvington, in the county of Essex and State of New Jersey, have invented new and useful Improvements in Dirigible Automatic Headlights, of which the following is a specification.

This invention relates to a headlight mechanism for vehicles in which the headlights are automatically swung simultaneously with and parallel with the front wheels of the vehicle so that the light rays are always projected upon the roadway directly in the line of travel of the vehicle.

The objects of the invention are to provide a headlight mechanism of the character described embodying novel features of construction to positively and automatically swing the headlights about a vertical axis simultaneously with any turning of the front wheels of the vehicle to maintain the light rays directly in the line of travel of the vehicle; to provide such a headlight mechanism which without modification of its parts can be applied to vehicles of different sizes; to secure a headlight mechanism which occupies a minimum amount of space, which can be applied to various types of vehicles without modification of the vehicles or the headlight mechanism, and which in no way detracts from the appearance of the vehicle to which it is applied; to obtain a headlight mechanism consisting of a minimum number of parts, which is simple, inexpensive and durable in construction, and which will not easily get out of repair; to provide such a mechanism which is reliable in operation and which insures the turning of the headlights the proper distance to maintain their projected rays in the proper direction; and to obtain other objects and results as may be brought out by the following description.

Referring to the accompanying drawings, in which like numerals of reference indicate the same parts throughout the several views, Figure 1 is a fragmentary top plan view of an automobile chassis, having a headlight mechanism embodying my invention applied thereto;

Fig. 2 is an enlarged sectional view and side elevation taken on the line 2—2 of Fig. 1;

Fig. 3 is a vertical sectional view taken on the line 3—3 of Fig. 2, with the lamp removed, and Fig. 4 is a similar view on the lines 4—4 of Fig. 2.

In the specific embodiment of the invention illustrated, the numerals 1 designate the side bars of a conventional automobile chassis, and 2 the front axle of the vehicle. The front wheels 3 are journaled in a conventional manner in the forked ends 4 of the axle 2 upon steering knuckles 5, and are adapted to be swung upon the knuckles 5 to change the direction of travel of the vehicle by means of the steering arms 6 projecting rearwardly from the knuckles 5 and connected by a tie rod 7 which in turn is connected to a conventional steering post mechanism (not shown).

My headlight mechanism comprises a pair of lamps 8 supported in bracket forks 9 which are rigidly connected to vertical lamp spindles 10 rotatably mounted in bearing sleeves 11 secured to angle brackets 12 bolted or otherwise secured to the side bars 1 of the chassis adjacent the forward ends thereof, as at 13.

The lower end of each of the lamp spindles 10 projects downwardly below the corresponding bearing sleeve 11 and has rigidly connected thereto, as by the pin 15, one end of a slidably extensible arm 16, said arm comprising a socket member 17 which telescopically receives the other section 18 thereof. The opposite end of said arm 16 is pivotally connected at 19 to one end of a translating lever 20 pivotally connected centrally of its length by a vertical bolt 21 to a bracket 22 rigidly secured to the bar 1 of the chassis, the opposite end of said translating lever being pivotally connected at 23 to one end of an arm 24 similar in construction to the lamp spindle arm 16. The opposite end of said arm 24 is rigidly secured to a vertical rotatable member or shaft 25 journaled in a bracket 26 fastened upon the bar 1 of the chassis. This shaft 25 is of sufficient length that its lower end is in substantially horizontal alinement with the tie rod 7, said lower end of the shaft being pivotally connected by a horizontal pivot pin 27 to one end of the tie rod arm 28 similar in construction to the arms 16 and 24, the opposite end of said link 28 being pivotally connected at 29 to a tie rod clamp 30, which is loosely mounted to oscillate on the tie rod 7 and is held against longitudinal movement upon the tie rod by the set collars 31.

In the operation of the device, as the tie rod 7 moves one way or the other to swing the wheels 3, the tie rod clamps 30 are moved therewith and cause the tie rod arms 28 to oscillate the operating shafts 25. This movement swings the arms 24 to oscillate the translating levers 20, wihich in turn swing the lamp spindle arms 16 to rotate the lamp spindles and lamps parallel with the wheels 3. The tie rod clamps 30 oscillate on the tie rod and the arms 28 swing vertically about pivot pins 29 to allow for relative vertical movement of the chassis and axle due to the vehicle springs. The distance between the tie rod 7 and shafts 25 is such that the lamps 8 are swung the proper distance and maintained parallel to the wheels 3 as the tie rod 7 moves one way or the other to swing the wheels 3, so that the tie rod arms 28 cause a movement of the lamps equal to the movement of the wheels 3. The action of the arms 24 and 28, and the shaft 25 is in effect the same as a lever pivoted on the bracket 26. The distances between each of the other pivots 23, 21, 19 and lamp spindles 10 are also equal to the length of the tie rod arms 28 so that the degree of movement of the tie rod arms is transmitted without multiplication or decrease to the lamp spindles, and the amount of turning of the lamps 8 is thus always equal to the amount of movement of the wheels 3. The various arms 16, 24 and 28 are slidably extensible so that oscillation thereof on the pivots is unrestricted and free from binding, the telescoping connections of the sections of the arms tending to eliminate rattling thereof. It will be noted that the direction of movement of the arms 24 is opposite to that required to turn the lamps in the proper direction, but the translating levers 20 translate this movement into one in the proper direction. Also the translating levers 20 provide for spanning the space between the tie rods 7 and lamp spindles on vehicles in which the lamps are spaced a distance ahead of the front axle, and at the same time provide for proper degree of movement of the lamps. My mechanism comprises a small number of simply constructed parts, and when in normal position these parts are arranged in substantial alinement so as to occupy a minimum amount of space. The arms 16, 24 and 28 are interchangeable so as to simplify construction and assembly, and produce a comparatively inexpensive mechanism.

Various modifications and changes may be made in manufacturing my improved headlight by those skilled in the art without departing from the spirit and scope of the invention, and I do not wish to be understood as restricting myself except as required by the following claims when construed in the light of the prior art.

Having thus described the invention, what I claim is:

1. In headlight mechanism for vehicles the combination with a chassis, axle, wheels mounted on steering knuckles upon said axle, and a tie rod connecting said steering knuckles, of a lamp bracket rotatably mounted upon said chassis, a lever pivotally mounted between its ends on said chassis, a member pivotally mounted on said chassis and having oppositely extending arms one of which is pivotally connected to one end of said lever and the other of which is pivotally connected to said tie rod, and an arm on said lamp bracket pivotally connected to the other end of said lever.

2. In headlight mechanism for vehicles, the combination with a chassis, axle, wheels mounted on steering knuckles upon said axle and a tie rod connecting said steering knuckles, of a lamp bracket rotatably mounted upon said chassis, an arm having one end thereof pivotally connected to the tie rod, a rotatable member on said chassis and connected to the opposite end of said arm, a second arm having one end thereof rigidly connected with the said rotatable member, a lever pivoted centrally of its ends upon said chassis and having one end thereof pivotally connected with the free end of said second-mentioned arm, and a third arm having one end thereof connected to said lamp bracket and the opposite end thereof pivotally connected to the other end of said lever, movement of said tie rod causing oscillation of the various arms and levers to rotate the lamp bracket parallel with the wheels of the vehicle.

3. In headlight mechanism for vehicles, the combination with a chasis, axle, wheels mounted on steering knuckles upon said axle, and a tie rod connecting said steering knuckles, of a lamp bracket rotatably mounted upon said chassis, an arm having one end thereof pivotally connected to said tie rod, said arm being formed in two slidably telescoping sections, a shaft journaled upon said chassis and connected to the opposite end of said arm, a second arm similar in construction to said first-mentioned arm having one end thereof connected to said shaft, a lever pivoted centrally of its length upon said chassis and having one end thereof pivotally connected to the other end of said second-mentioned arm, a third arm similar in construction to said first and second-mentioned arms and having one end thereof pivotally connected to the other end of said lever, the opposite end of said third-mentioned arm being connected to the lamp bracket, movement of the tie rod causing oscillation of the various arms and levers to rotate the lamp bracket parallel with the wheels of the vehicle.

LEON T. SCHALLER.